Sept. 16, 1958 J. BROWN 2,852,748

CARRIER FREQUENCY CONVERTER SYSTEM

Filed April 27, 1956

INVENTOR
JOHN BROWN

BY

ATTORNEYS

United States Patent Office 2,852,748

Patented Sept. 16, 1958

2,852,748

CARRIER FREQUENCY CONVERTER SYSTEM

John Brown, Ann Arbor, Mich., assignor to the United States of America as represented by the Secretary of the Navy Application April 27, 1956, Serial No. 581,259

2 Claims. (Cl. 332—41)

(Granted under Title 35, U. S. Code (1952), sec. 266)

The invention described herein may be manufactured and used by or for the Government of the United States of America for governmental purposes without the payment of any royalties thereon or therefor.

This invention relates generally to electrical servo systems and more particularly to an improved carrier frequency converter system for servo mechanisms.

Although synchro data converter systems for converting data modulated carriers of a first frequency to more suitable data modulated carriers of a second frequency, i. e. 400 C. P. S. to 60 C. P. S. are well known in the art, none of the heretofore devised systems have proved entirely satisfactory in all conditions of service because of instability in operation and susceptibility to drift. Furthermore in military applications of heretofore devised synchro, or servo, converter systems, the problem of microphonics has been introduced into the systems.

Accordingly, one object of the present invention is to provide a new and improved stable carrier frequency converter system.

Another object of the present invention is to provide a new and improved drift free carrier frequency converter system.

Still another object of the present invention is to provide a new and improved carrier frequency converter system substantially free of microphonics.

A further object of the present invention is to provide a new and improved synchro data converter system.

Figure 1:
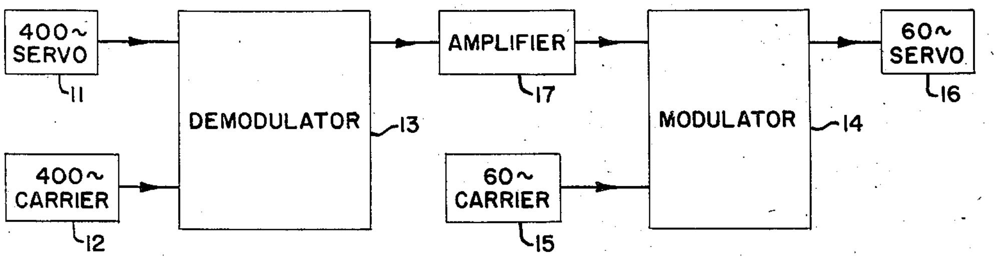
FIG. 1. PRIOR ART
Figure 2:
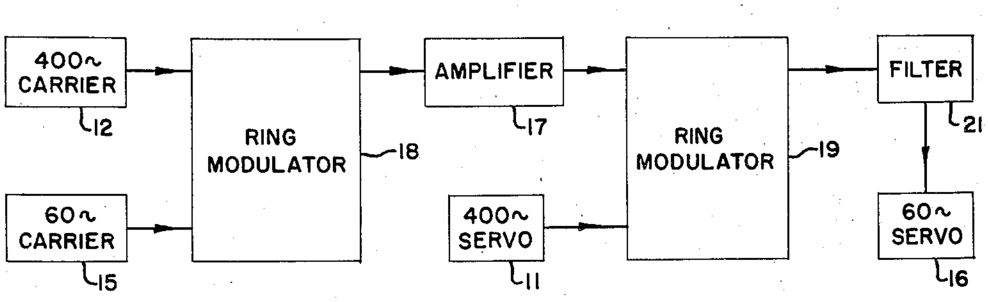

Other objects and many of the attendant advantages of this invention will be readily appreciated as the same becomes better understood by reference to the following detailed description when considered in connection with the accompanying drawings wherein:

Fig. 1 is a block diagrammatic view broadly showing a conventional synchro data converter system; and Fig. 2 is a block diagrammatic view broadly showing the novel synchro data converter system of the present invention.

Referring now to the drawing wherein like reference numerals indicate like parts throughout the several views and more particularly to Fig. 1 whereon a conventional synchro data converter system for converting a 400 C. P. S. data signal to a 60 C. P. S. data signal is illustrated. As shown thereon, a source, such as a 400 C. P. S. servo, of a data modulated 400 C. P. S. signal 11 and a source of an unmodulated 400 C. P. S. reference carrier signal 12 is electrically connected to a conventional demodulator 13 wherein the signals are mixed and an output signal is developed correlative to the modulating intelligence on the signal from source 11. The output signal of demodulator 13 is fed into a conventional modulator 13 wherein it is impressed upon a 60 C. P. S. carrier from source 15 thereby developing the desired data modulated 60 C. P. S. output signal for use by an appropriate utilization device 16, such as a 60 C. P. S. servo. An amplifier 17 is generally inserted between the demodulator 13 and modulator 14 to amplify the output signal from demodulator 13.

It may be apparent from a cursory review of the arrangement of the conventional converter system that the comparatively low level of the output signal from demodulator 13 is susceptible to drift and subject to loss of intelligence from such factors as transmission line attenuation, microphonic noise, hash, etc. Additionally the insertion of amplifier 17 tends to accentuate the drift where the intelligence consists of D. C. or slowly changing variations.

Fig. 2 illustrates the subject inventive arrangement for a synchro data converter system for, by way of example and not limitation, converting a data modulated 400 C. P. S. signal into a modulated 60 C. P. S. signal wherein the limitations of presently utilized carrier converter systems are effectively overcome or substantially minimized. As shown thereon the output signals from a 400 C. P. S. reference carrier, $f_1$ source 12 and a 60 C. P. S. reference carrier $f_2$ source 15 are connected to the input circuits of a conventional ring modulator 18 wherein the two signals are mixed to produce a signal across the output circuit of the ring modulator which consists of the sum and difference frequencies of the input signals; i. e., $f_1 \pm f_2$, or 400±60 C. P. S. The output of ring modulator 18 is transmitted to a second conventional ring modulator 19 through an amplifier 17 which may be utilized to amplify both components, or sidebands, of the transmitted signal, and additionally may be utilized to filter out any undesirable frequency components of the transmitted signal. A source of data modulated 400 C. P. S. $f_1$ [mod.] signal 11 is also connected to the input of ring, or balanced bridge, modulator 19 wherein by ring modulator action a data modulated signal is developed across the output of the ring modulator 19 consisting of the sum and difference frequencies of the input signals; i. e., $f_1+f_2+f_1$ [mod.], $f_1+f_2-f_1$ [mod.], $f_1-f_2+f_1$ [mod.], $f_1-f_2-f_1$ [mod.], or 460±400 C. P. S. and 340±400 C. P. S. for use by a utilization device 16 such as a 60 C. P. S. servo. In order to eliminate other than the desired data modulated 60 C. P. S. frequency $f_2$ [mod.] in the signal developed by ring modulator 19, it may be desirable to insert an appropriate filter, or tuned amplifier, 21 between the utilization device 16 and ring modulator 19.

It may now be apparent that the novel arrangement of the subject inventive system is less susceptible to the problems of presently utilized carrier frequency converter systems inasmuch as no carrier free signal exists in the subject inventive system.

It is to be understood that although the subject invention has been described and illustrated as a 400 C. P. S. to 60 C. P. S. servo motor, or synchro, data converter, the application and frequencies disclosed herein are by way of example, and not limitation, and that the subject inventive system may be utilized in any similar carrier frequency converter application.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A synchro data carrier frequency converter system comprising a source of a first synchro carrier frequency, $f_1$, a source of a second synchro carrier frequency, $f_2$, a first ring modulator having input circuits individually coupled to said sources and an output circuit across which a first output signal including sum, $f_1+f_2$, and difference, $f_1-f_2$, frequencies are developed, a tuned amplifier coupled to said output circuit for amplifying only said sum and difference frequencies, a source of a data modulated first synchro carrier frequency $f_1$ [mod.], a second ring modulator having input circuits individually coupled to said tuned amplifier and to said data modulated carrier source and an output circuit across which an output signal including the sum and difference components of said data modulated first carrier frequency and said sum and difference frequencies, $[f_1 \pm f_2]+f_1$ [mod.], $[f_1 \pm f_2]-f_1$ [mod.], is developed, and circuit means coupled to the output circuit of said second ring modulator for translating only the data modulated second synchro carrier frequency component of the output signal across the output circuit of said second ring modulator.

2. A data carrier frequency converter system according to claim 1 wherein said circuit means comprises a frequency selective filter network.

References Cited in the file of this patent

UNITED STATES PATENTS 2,529,065 Agins ------------------- Nov. 7, 1950
2,705,304 Fiet ------------------- Mar. 29, 1955